(No Model.)
A. LINDGREN.
WHEEL PLOW.
No. 308,680. Patented Dec. 2, 1884.
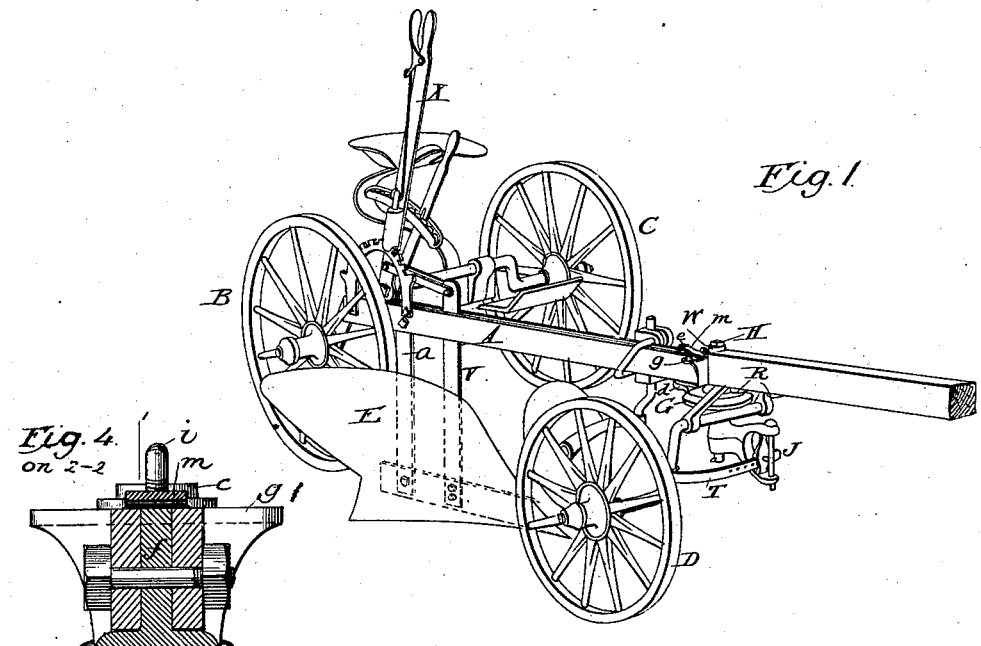
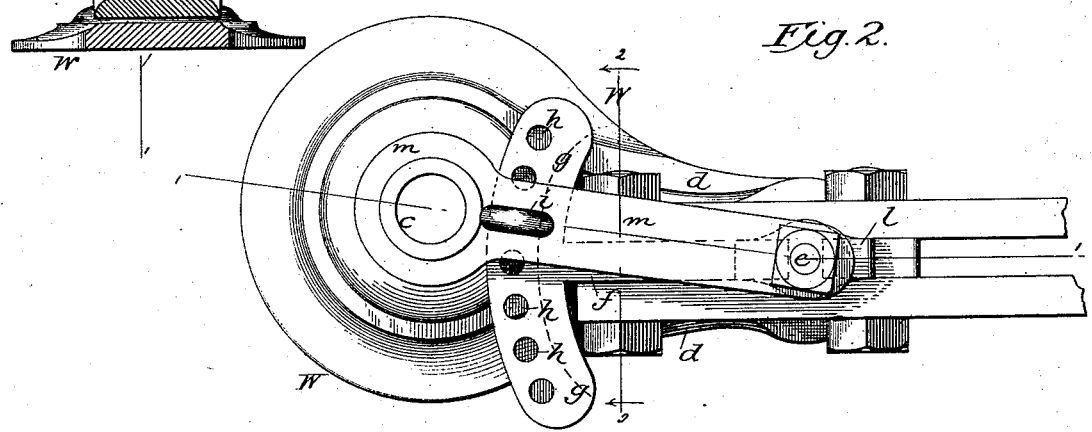
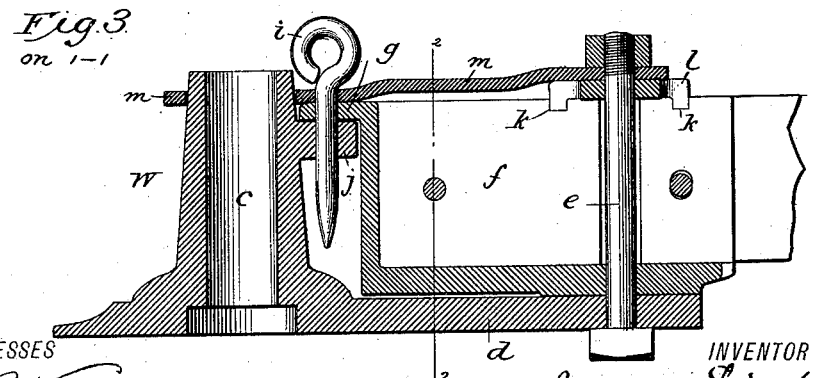
WITNESSES
Sidney P. Hollingsworth
Newton Wyckoff
INVENTOR
August Lindgren
By P. T. Dodge
Attorney

UNITED STATES PATENT OFFICE.

AUGUST LINDGREN, OF MOLINE, ILLINOIS, ASSIGNOR TO THE MOLINE PLOW COMPANY, OF SAME PLACE.

WHEEL-PLOW.

SPECIFICATION forming part of Letters Patent No. 308,680, dated December 2, 1884.

Application filed August 20, 1884. (No model.)

*To all whom it may concern:*

Be it known that I, AUGUST LINDGREN, of Moline, in the county of Rock Island and State of Illinois, have invented certain Improvements in Wheeled Plows, of which the following is a specification.

This invention relates to that class of wheeled plows in which a mold-board plow is secured firmly but adjustably to a frame carried upon wheels. It is designed more particularly for use in those plows in which the frame is carried by a wheel on the landside, a wheel carried in the new furrow behind the plow, and a swiveled leading-wheel which travels in advance of the plow in the preceding furrow, as illustrated, for example, in the patent granted to J. W. Bartlett, April 25, 1884, No. 296,720.

It is the aim of the present invention to secure the lateral adjustment or deflection of the plow with respect to the leading-wheel and draft devices, in order that it may be caused to take more or less land, and that the plow may be operated by two or three horses driven abreast, as the character of the soil may render necessary.

To this end the invention consists, essentially, in combining with the plow frame or beam and the leading-wheel a swivel-joint, constructed as hereinafter explained, to permit the axle of the leading-wheel to be adjusted to the right or left with respect to the frame or beam.

Referring to the accompanying drawings, Figure 1 is a perspective view of a plow having my improvement embodied therein. Fig. 2 is a top plan view of the improved coupling. Fig. 3 is a longitudinal vertical section through the center thereof. Fig. 4 is a cross-section on the line *z z*.

Referring to the drawings, A represents a horizontal frame or beam sustained by three wheels, B, C, and D. The first is arranged to travel in the newly-formed furrow, the second to travel on the unplowed land, and the third to travel in advance of the plow in the furrow last completed. The land-wheel C is mounted on a crank-axle, whereby it may be adjusted vertically. The leading-wheel D is mounted on one end of the overhung axle, the inner end of which is attached to a swiveling plate, G, connected by a vertical pivot-pin or king-bolt, H, to a draft-head, W, which is bolted firmly to the front of the frame, this construction permitting the axle and the leading-wheel to swing horizontally. Around the inner end of the axle there is journaled a plate, R, to which the draft pole or tongue is firmly bolted, this connection permitting the tongue to swing vertically, while at the same time it is caused to control the swiveling action of the wheel. Draft devices J are swiveled to the lower end of the king-bolt, and connected by a lateral brace, T, with the outer end of the axle, whereby the draft is caused to assist in maintaining the wheel in the proper position. An ordinary mold-board plow, E, is connected at its heel end by a horizontal pivot to the lower extremity of an arm, *a*, attached rigidly to and extending downward from the main frame or beam A, this connection permitting the point of the plow to be raised and lowered. At its front the plow is provided with a rigid standard, V, which is extended upward through a vertical slot in the frame or beam, and connected by intermediate devices to a hand-lever, X, which is also connected to the shaft of the land-wheel, the one lever serving to effect simultaneously the vertical adjustment of the plow-point and the land-wheel.

The foregoing parts are constructed and arranged to operate in essentially the same manner as in the Bartlett patent before alluded to, and, with the exception of the peculiar construction of the draft-head hereinafter described, they are foreign to the present invention.

In the practical operation of the patented plow in the field it has been found desirable to provide a means of adjusting the forward end of the frame or beam A laterally with respect to the king-bolt and without changing the adjustment of other parts. To this end I connect the draft-head W with the frame or beam A by means of a vertical pivot in such manner that it may swing sidewise, and provide it with a locking device, by which it may be held in the position required. The preferred form of the parts is represented in Figs. 2 and 3. The draft-head W is made of considerable length, with a vertical tubular sleeve or post, *c*, at the forward end to receive the king-bolt, and with a plate, d, extending thence backward to receive the vertical pivot-pin e, which extends downward through a plate, f, bolted within the forward end of the frame or beam A. The pin e serves as a connection between the beam and the draft-head, permitting the latter to swing laterally.

In order to lock the two parts in the position in which they may be adjusted, the plate f is formed at the forward end with a laterally-extended flange, g, having a series of holes, h, therein, and the draft-head provided with a pin, i, which may be inserted through one or another of the holes h, and into a perforated ear, j, formed on the draft-head, in the manner represented in Figs. 2 and 3.

In order to permit of the plate being conveniently molded, I prefer to construct it, as shown, with an opening or slot in its upper portion to admit the bolt e; and in order to give the plate, which is weakened by the formation of this slot, the necessary strength, I form in its upper edge, on opposite sides of the slot, notches k, which receive the lips at opposite ends of a strengthening-plate, l, which is applied to the top, as shown, this plate spanning the slot and encircling the upper end of the pivot e. As a further means of strength, I provide a suitably-formed plate, m, preferably of wrought-iron, and apply one end of the same around the upper end of the pivot e, and its opposite end around the tubular portion of the draft-head. It will be observed that under this construction the pivot-pin e is connected at both extremities to the draft-head.

The device constructed as above is applied to the plow in the manner represented in Fig. 1, and simply inserted in place of the rigid draft-head formerly employed. If it be required to effect a lateral adjustment of the frame or beam with respect to the draft-head, it is only necessary to remove the pin i and swing the plate f as may be demanded, the pin being again inserted after the adjustment is effected, to hold the parts rigidly in position.

While it is preferred to retain the peculiar formation of parts represented in the drawings, it is manifest that they may be modified in form and arrangement to a considerable extent without changing their mode of action or passing beyond the scope of the invention, which consists, essentially, in combining with the plow frame or beam and the axle of the leading-wheel a joint to permit the lateral adjustment of the beam.

It is to be noted that my joint does not permit the beam to swing laterally while in action, and also that, inasmuch as the plow is rigidly connected to the beam or frame in such manner as to have no lateral play in relation thereto, the change in the adjustment of the joint has the effect of controlling positively the position in which the plow is carried with respect to the line of draft.

It is manifest that my improvement may be employed in connection with plows which have wheels at both ends of the leading-axle, and that the details of the leading-wheel and draft devices may be varied at will. It is to be understood that the lateral deflection of the beam and plow, to which reference is herein made, is a deflection in a horizontal direction to the right or left, so as to change the horizontal angle of the beam and landside with respect to the line of travel. Such deflection is to be clearly distinguished from the deflection effected by rolling or tipping the beam to one side in order to throw the plow-standard out of the perpendicular.

Having thus described my invention, what I claim is—

1. In a plow, the beam or frame provided with sustaining-wheels, and a mold-board plow fixed thereon, in combination with the leading wheel and axle, and the draw-head connected by a vertical pivot with the forward axle, and attached firmly to the beam by devices, substantially as described, adapted to permit the lateral adjustment of the forward end of the beam, whereby the point of the plow may be adjusted to the right or left with respect to the line of draft, and fixed in position to take more or less land, as occasion may require.

2. In combination with the frame or beam, its carrying-wheels, and the mold-board plow secured thereto, the leading wheel and axle, the draw-head W, with one end connected by a vertical pivot to the beam, and the opposite end connected by a vertical pivot to the axle, and the pin or locking device holding the head rigidly in position with respect to the beam, but permitting its lateral adjustment at will, whereby the plow may be fixed in position to take more or less land, as occasion may demand.

3. In a wheeled plow, the combination of the beam or frame, the draw-head W, the vertical pivot e, the locking-pin i, and the forward axle swiveled to the draw-head W.

4. In combination with the draw-head and the vertical pivot e, the plate f, provided with notches k, the strengthening-plate l, and the plate m, applied as shown.

5. In a wheeled plow, the combination of the leading-wheel and its axle, the draw-head W, swiveled thereto, the plow beam or frame A, the vertical pivot e, the head f, provided with the series of perforations h, and the locking-pin i.

In testimony whereof I hereunto set my hand, this 28th day of July, 1884, in the presence of two attesting witnesses.

AUGUST LINDGREN.

Witnesses:
A. R. BRYANT,
GEO. STEPHENS.